Patented Feb. 24, 1942

2,273,832

UNITED STATES PATENT OFFICE 2,273,832

METHOD OF MAKING METAL POWDER

Elvin P. Carney, Elizabeth, N. J., assignor to Metals Disintegrating Company, Inc., Elizabeth, N. J., a corporation of New Jersey No Drawing. Application August 2, 1940, Serial No. 350,139

1 Claim. (Cl. 75—0.5)

This invention relates to the production of metal powders, and particularly such as comprise a core of relatively high-melting-point metal which is coated with a relatively lower melting point metal. Such powders have numerous practical applications, as, for example, the construction of metallic filtering media, so-called oil-less bearings, etc., where a porous metallic structure is involved.

It has been suggested to make structures of the kind referred to from a simple metal powder, the particles being more or less welded together by heat and/or pressure. Pressure alone does not give a good bond between the particles, and furthermore tends to close the interstices upon which the functioning of the structure depends. Welding is difficult, because it is not easy to make a porous sintered product consisting of but one metallic constituent. It is difficult to so regulate the temperature that the particles may become welded together, without fusing the entire mass and thereby destroying or preventing the development of the desired porous character of the product. Attempts have been made to overcome these difficulties by the use of powders of two different metals of widely different melting point, the lower melting point metal serving as a bond for particles or granules of the higher melting point metal. Trouble has been experienced, however, in carrying this idea into effect.

An object of the present invention is to provide a metallic powder comprising particles each of which is a core of relatively high-melting-point metal, which is provided with a sheath or envelope of relatively low-melting-point metal, the powder having such characteristics that it may be effectively used for the production of porous structures such as are referred to above.

In order to produce pores of useful size, the core or foundation particle should be fairly coarse. For example, the core particle size may range from minus 80 to plus 200 mesh, to minus 30 to plus 40 or larger. If the coating metal is mixed with the core or foundation particles in particles of the same size as that of the core particles, the coating will be spotty and non-uniform and incomplete, and the bond between the foundation particles will be unsatisfactory. If the coating metal is applied in the form of particles more finely divided than the base or core paritcles, segregation will take place if the two powders be mixed together dry. Nevertheless, for other reasons it is desirable, in one form of my invention, that the coating metal be provided and available in extremely finely divided form, for example, 97 to 98% minus 325 mesh, as compared with minus 30 plus 40 for the core particle size. I have found that it is necessary to provide some sort of bond between the coating particles and the cores strong enough to hold the coating particles in place until the temperature used in bringing about the coating, in one form of my invention, has reached the melting point of the coating metal. Where the process involves the use of core particles and coating particles to be attached thereto, such a temporary bond may be produced by means of moisture, or by a suitable adhesive. In another form of the invention I may deposit the coating metal on the core particles by chemical replacement or electrochemical deposition, as hereinafter described. However, I prefer the procedure in which powders of the two metals are utilized for core and coating respectively.

For a low-melting-point coating metal like tin (M. P. 232° C.), if the core metal is copper, the two powders may be mixed and moistened, whereupon the fine tin powder adheres to the copper particles in a quite complete and uniform coat, the tin powder being in quantity sufficient to give this result. The matter of mixing with moisture is of special importance because thereby segregation and settling out, as between the large core particles and the very fine coating particles, are substantially avoided. If the copper core particles are nodular or spherical (which is the form I prefer), the result of atomizing molten copper, the copper will contain a certain amount of oxygen. as cuprous oxide, dissolved and dispersed in the copper, the eutectic being 3.45% cuprous oxide containing 0.39% oxygen, and as the surface of the copper in contact with the air when changing from the liquid to the solid state is oxidized. this surface oxidation involves approximately 1.00% oxygen, depending on the surface area of the particles. The treatment of the copper-tin mixture is conducted in a hydrogen atmosphere, in order to remove the surface oxide film, so that the bonding tin will adhere most effectively to the copper. Some of the dissolved cuprous oxide is reduced, as is evidenced by the removal of 0.44% of oxygen if the temperature be run up to say 850° C., in what is known as a hydrogen loss test. Assuming that the coarse copper particles, nodular or spherical, have been mixed as described with the very finely divided tin powder in proportions of 90 parts of copper to 10 parts of tin, the mixture is subjected to the treatment in hydrogen atmosphere as above stated, for say one hour, at a temperature of 700°

C. As the result of this treatment there is not a complete alloying of the copper and tin, because with the stated time and temperature factors there will not be complete diffusion of the tin into the copper. A microscopic examination of the finished material discloses, first, a relatively large solid core of copper, showing some pitting due to removal of oxygen, but no alloying; second, a zone exteriorly of the central copper core which is an alloy of copper and tin and which is in fused relation to the central core; and, third, a distinct outer coating of tin and/or high-tin-copper alloy exteriorly of the alloy section and in fused relation therewith.

A particle of copper just small enough to pass through the opening of a specified screen will be coated in this way and thereby increased in size so that it will no longer pass through that opening. This particle can be reduced in size by attrition in a grinding mill, but tests have demonstrated that it is the exterior tin and/or high-tin-alloy which is removed and not the copper core.

In place of the simple moistening of the mixed powders, I may use a suitable adhesive, such as a clear cellulose lacquer, to which the coating metal has been added in finely divided form, preferably the flake form utilized in the manufacture of so-called bronze paints, the finer the mesh, the better. This mixture is added to the mass of foundation or core particles of copper, and thoroughly stirred, so that there is good distribution of lacquer and coating powder with respect to the foundation particles. Heat is then applied to the mixture as described above, that is to say, a temperature high enough and for a time long enough to melt the tin particles to the extent necessary to produce the desired thickness of coating or sheath around the copper particles and without accomplishing complete alloying. This heat treatment should preferably be done in a reducing or at least in an inert atmosphere. During the heating step the mixture should be kept in a state of agitation, and as soon as the coating metal has melted and alloyed sufficiently with the foundation powder to provide the requisite fusion bond with the copper particle when cold, the mixture is then poured into water to prevent its setting to a unitary porous mass. Even with this water-cooling step there will be some adhesions between particles; but by grinding the product these adhesions may be broken to produce the desired loose coated powder, a mass of which can be molded to desired form, with or without pressure, and finally sintered to preserve that form and produce a porous metal structure of the desired strength and porosity.

I have had good results with another procedure in which I took blown (atomized) copper minus 14 plus 100 mesh, in the form of spheres, and after reducing it in hydrogen, mixed it with very fine tin powder (minus 325 mesh) in proportions of 90% copper to 10% tin. A flux composed of glycerine with 10% by weight of ammonium chloride was added to the mixed metals to form a fairly liquid paste. This paste was heated until the tin melted and coated the copper particles, the materials being constantly stirred. When properly coated and while still plastic, the material was poured into cold water; if the plastic mass were allowed to cool slowly it would set in one solid mass. The material was washed to remove the flakes, dried and then ground to break up the agglomerates, and screened.

Organic adhesives are not ordinarily suitable for high-melting-point coating metals like silver (M. P. 960° C.) since with any such temperature the adhesive is totally destroyed or carbonized before the temperature reaches the melting point of the coating metal. In such cases, or in cases where for any reason the use of simple moisture or an adhesive as a temporary binder is not practicable, chemical or electrochemical deposition may be utilized as a method of preliminarily providing the foundation particle or sphere.

Another method which I have employed is to coat the core particle with the finely divided coating metal by means of the lacquer method described above, followed by drying, but omitting the heat treatment. This does not give so desirable a product as does the process which results in the actual fusion union of core and coating, because of the possibility of dislodgment of the coating particles from the core as the result of impacts or attrition that may occur in transportation or handling.

Instead of applying the coating metal to the core in the form of finely divided powder, I may resort to chemical deposition, or electroplating, followed in either case by the heat treatment already described to produce the coating actually fused to the core.

I believe that the finished powder in which the coating metal is actually fused to the foundation core as a continuous relatively thin coating, has special advantages. In the first place, by reason of the partial alloying that has taken place between the two metals, there is apt to be less shrinkage in the finished porous metal article made from the powder by any of the procedures familiar to the art. Furthermore, by selecting a ratio between the particle size of the high-melting-point metal as compared with that of the low-melting-point coating metal, it is possible to control the depth of the coating resulting from the employment of given heat treatment conditions (viz., temperature and time), and thereby also to control to some extent the strength and other physical characteristics of a porous metal piece made from the powder. As compared with the powder in which fine coating particles are held in place on the core by some adhesive or binder, it is obvious that the powder in which the coating is fused to the core has the advantage of durability.

And as compared with the method of making a preliminary coating by the replacement or the electrochemical method, I believe that a method which merely involves the weighing out of a particular amount of core powder and coating powder lends itself to simpler control than either the replacement or electrochemical processes where it is difficult to make quantitative determinations as to the thickness of coating obtained.

I have employed one or more of the methods above described to coat nickel with copper, copper with silver, nickel shot with powders made from a bronze alloy (copper 86 to tin 14%), and, of course, copper with tin.

I claim:

The method of manufacturing molding powder which consists in providing a quantity of metal core particles of a given melting point and given size, and a relatively smaller quantity of other metal particles of relatively lower melting point and relatively much smaller size, mixing and moistening the particles whereby the core particles are given a uniform coating of adherent finer particles, and subjecting the so-treated core particles, in a reducing atmosphere, to heat sufficient and for a sufficient length of time to cause an incomplete diffusion of the fine particles into the respective core particles which they surround, so that there is produced a molding powder comprising core particles of the high melting point metal, each having a sheathing of the low melting point metal of desired thickness and in fused relation to the core, substantially as and for the purposes set forth.

ELVIN P. CARNEY.